United States Patent
McNulty et al.

(10) Patent No.: US 11,718,394 B2
(45) Date of Patent: Aug. 8, 2023

(54) ANTI-TORQUE AND PROPULSION SYSTEM FOR ROTORCRAFT

(71) Applicant: The Boeing Company, Chicago, IL (US)

(72) Inventors: Michael J. McNulty, Scottsdale, AZ (US); Glenn T. Pyle, Mesa, AZ (US)

(73) Assignee: The Boeing Company, Arlington, VA (US)

( * ) Notice: Subject to any disclaimer, the term of this patent is extended or adjusted under 35 U.S.C. 154(b) by 1021 days.

(21) Appl. No.: 16/385,937

(22) Filed: Apr. 16, 2019

(65) Prior Publication Data

US 2020/0331600 A1 Oct. 22, 2020

(51) Int. Cl.
B64C 27/82 (2006.01)

(52) U.S. Cl.
CPC ...... B64C 27/82 (2013.01); *B64C 2027/8236* (2013.01); *B64C 2027/8245* (2013.01); *B64C 2027/8281* (2013.01)

(58) Field of Classification Search
CPC ............ B64C 27/82; B64C 2027/8236; B64C 2027/8245
See application file for complete search history.

(56) References Cited

U.S. PATENT DOCUMENTS

| | | | |
|---|---|---|---|
| 3,807,662 A | 4/1974 | Velazquez | |
| 4,200,252 A | 4/1980 | Logan et al. | |
| 4,474,345 A * | 10/1984 | Musgrove | B64C 29/0066 244/12.5 |
| 4,948,068 A | 8/1990 | VanHorn | |
| 5,232,183 A * | 8/1993 | Rumberger | B64C 27/82 239/265.29 |
| 9,409,643 B2 * | 8/2016 | Mores | B64C 27/82 |
| 10,279,900 B2 * | 5/2019 | Robertson | B64C 27/06 |
| 10,562,641 B2 * | 2/2020 | Pantalone, III | B64C 27/04 |
| 10,933,990 B2 * | 3/2021 | Ivans | B64C 27/82 |
| 2008/0093500 A1 * | 4/2008 | Smith | B64C 27/82 244/17.19 |
| 2020/0223540 A1 * | 7/2020 | Ivans | B64C 27/82 |

* cited by examiner

*Primary Examiner* — Richard Green
(74) *Attorney, Agent, or Firm* — Duft & Bornsen, PC

(57) ABSTRACT

Tail boom drive systems for helicopters are described which utilize a fan internal to the tail boom to provide yaw control, and an external propulsor to provide forward thrust. In one embodiment, the tail boom drive system includes a shaft, a fan, and a propulsor. The shaft is disposed lengthwise within an interior space of the tail boom, and the shaft has a first end and a second end. The fan is mechanically coupled coaxially to the shaft within the interior space between the first end and the second end, and the fan generates a variable airflow directed towards the second end that is ejected from the interior space substantially perpendicular to the tail boom. The propulsor is external to the tail boom and is mechanically coupled coaxially to the shaft at the second end, and the propulsor generates a variable thrust directed towards the first end.

29 Claims, 17 Drawing Sheets

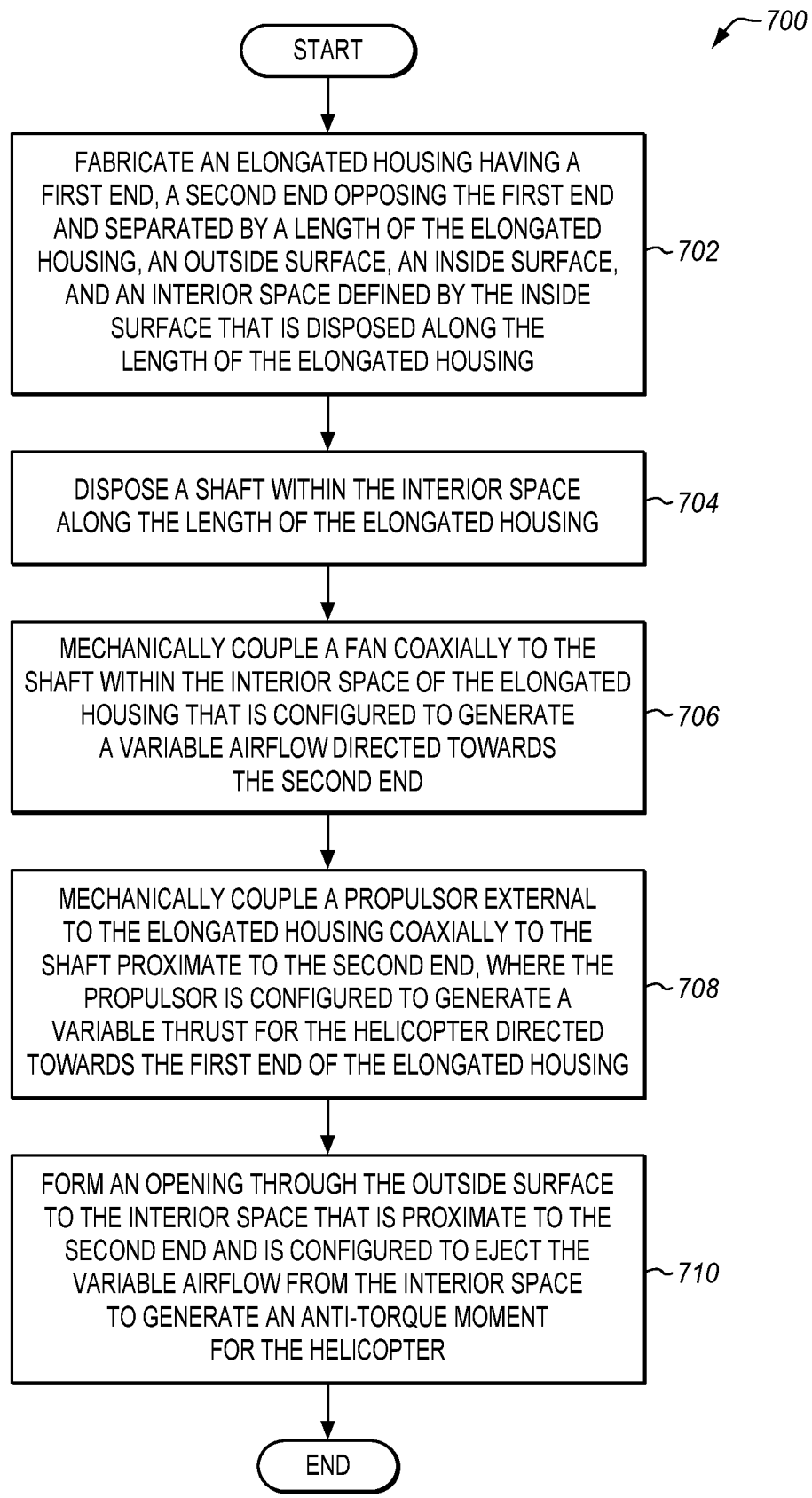

ANTI-TORQUE AND PROPULSION SYSTEM FOR ROTORCRAFT

FIELD

This disclosure relates to the field of rotorcraft and, in particular, to tail boom drive systems for rotorcraft.

BACKGROUND

A helicopter is a rotorcraft whose rotors are driven by a power plant during flight operations to allow the helicopter to take off vertically, hover, move forward, move backward, move laterally, and to land vertically. Helicopters with a single main rotor usually use a tail rotor to compensate for the torque generated by the main rotor during flight operations.

In helicopters, a tail boom extends from a fuselage and includes a tail rotor on an end of the tail boom. The tail boom operates as a moment arm for the thrust generated by the tail rotor. In order for the tail rotor to prevent the helicopter from yawing due to the torque generated by the main rotor, the thrust generated by the tail rotor is substantially perpendicular to the tail boom.

A drive system for a tail rotor typically includes one or more drive shafts that transmit mechanical power from the power plant to the tail rotor. At the end of the tail boom, an angled drive gearbox provides an angled drive for the tail rotor. When the tail rotor is not aligned along the long axis of the drive shaft(s), a short intermediate shaft may be used to transmit power from an intermediate gearbox to the angled drive gearbox for the tail rotor.

While a typical drive system for a tail rotor may operate sufficiently for most use cases, the tail rotor can generate drag during forward flight operations. Further, while the tail rotor may provide adequate anti-torque compensation during hover operations, less anti-torque compensation may be needed during forward flight although the tail rotor continues to rotate and utilize mechanical power.

Thus, drive systems for tail booms may be improved, especially in cases where enhanced flight capabilities for helicopters is desired.

SUMMARY

Tail boom drive systems for helicopters are described which utilize a fan internal to the tail boom that is coaxially mounted to a shaft to provide yaw control for the helicopter, and an external propulsor coaxially mounted to the shaft to provide forward thrust for the helicopter. The internal fan eliminates the external tail rotor typically used to provide yaw control on a helicopter, thereby reducing the drag on the helicopter during forward flight. The external propulsor improves the forward speed of the helicopter during fight operations by providing an additional forward thrust.

One embodiment comprises a tail boom drive system, comprising a shaft, a fan, and a propulsor. The shaft is disposed lengthwise within an interior space of a tail boom, and the shaft has a first end and a second end opposing the first end. The fan is mechanically coupled coaxially to the shaft within the interior space between the first end and the second end, and the fan generates a variable airflow directed towards the second end that is ejected from the interior space substantially perpendicular to the tail boom. The propulsor is external to the tail boom and is mechanically coupled coaxially to the shaft at the second end, and the propulsor generates a variable thrust directed towards the first end.

Another embodiment comprises a tail boom of a helicopter. The tail boom includes an elongated housing having a first end, a second end opposing the first end and separated by a length of the elongated housing, an outside surface, an inside surface, and an interior space defined by the inside surface that is disposed along the length. The tail boom further includes a shaft disposed within the interior space along the length and a fan mechanically coupled coaxially to the shaft within the interior space. The fan generates a variable airflow directed towards the second end. The tail boom further includes a propulsor external to the elongated housing that is mechanically coupled coaxially to the shaft proximate to the second end. The propulsor generates a variable thrust for the helicopter directed towards the first end. The tail boom further includes an opening through the outside surface to the interior space that is proximate to the second end and ejects the variable airflow from the interior space to generate a variable anti-torque moment for the helicopter.

Another embodiment comprises a method of fabricating a tail boom of a helicopter. The method comprises fabricating an elongated housing having a first end, a second end opposing the first end and separated by a length of the elongated housing, an outside surface, an inside surface, and an interior space defined by the inside surface that is disposed along the length. The method further comprises disposing a shaft within the interior space along the length and mechanically coupling a fan coaxially to the shaft within the interior space. The fan generates a variable airflow directed towards the second end. The method further comprises mechanically coupling a propulsor external to the elongated housing that is mechanically coupled coaxially to the shaft proximate to the second end. The propulsor generates a variable thrust for the helicopter directed towards the first end. The method further comprises forming opening through the outside surface to the interior space that is proximate to the second end and ejects the variable airflow from the interior space to generate a variable anti-torque moment for the helicopter.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIG. 7 is a flow chart of a method of fabricating a tail boom for a helicopter in an illustrative embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
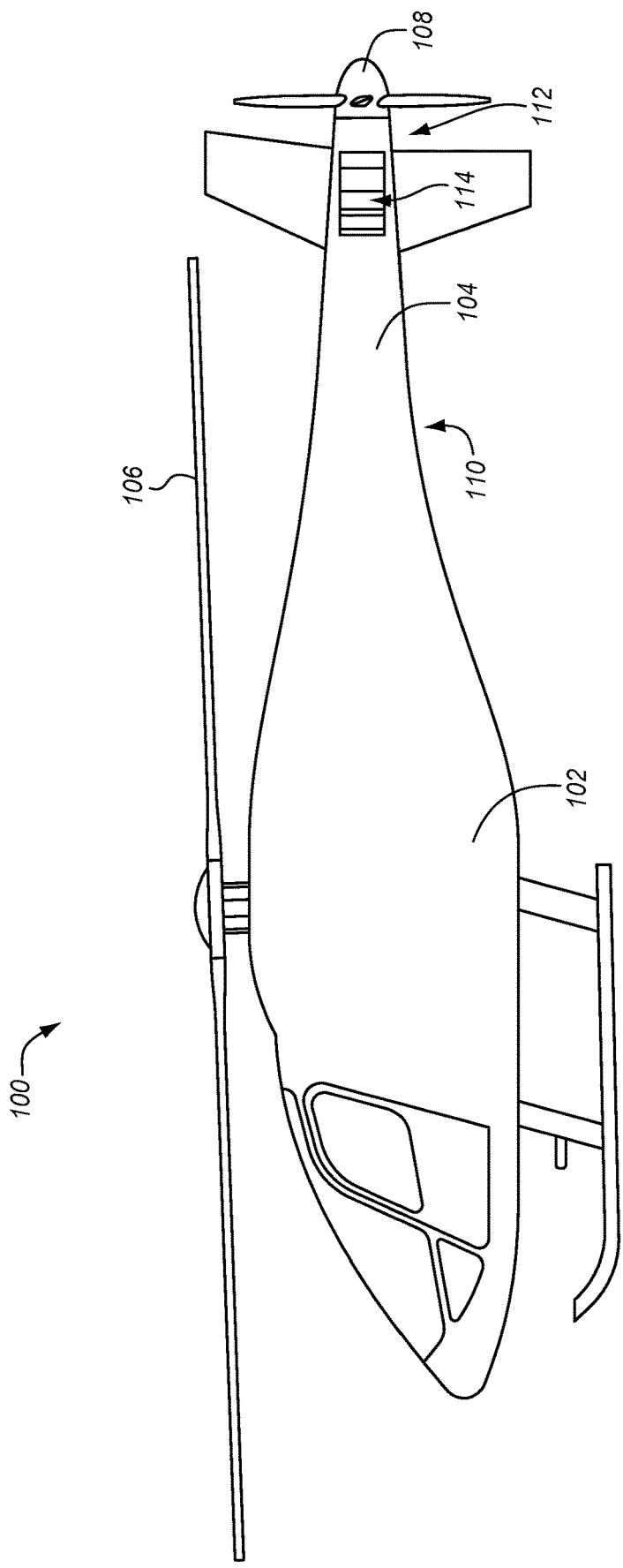
FIG. 1 is a side view of a helicopter in an illustrative embodiment.

FIG. 1 is a side view of a helicopter 100 in an illustrative embodiment. In this embodiment, helicopter 100 includes a fuselage 102, a tail boom 104 that has a first end 110 coupled to fuselage 102, a main rotor 106, and a propulsor 108 proximate to a second end 112 of tail boom 104. Tail boom 104 includes an opening 114 proximate to second end 112. Main rotor 106 provides lift to helicopter 100. In FIG. 1, helicopter 100 includes a single main rotor 106. In order to compensate for a yaw induced upon helicopter 100 from main rotor 106, a fan internal to tail boom 104 (not shown) directs a variable flow of air towards second end 112 of tail boom 104, which is ejected from opening 114 in tail boom 104. The variable flow of air ejected from opening 114 provides a substantially perpendicular variable thrust with respect to tail boom 104 to compensate for the yaw induced upon helicopter 100. In this embodiment, propulsor 108 is oriented to provide a variable thrust to helicopter 100 directed forward, thereby increasing the speed at which helicopter 100 travels.

Figure 2:
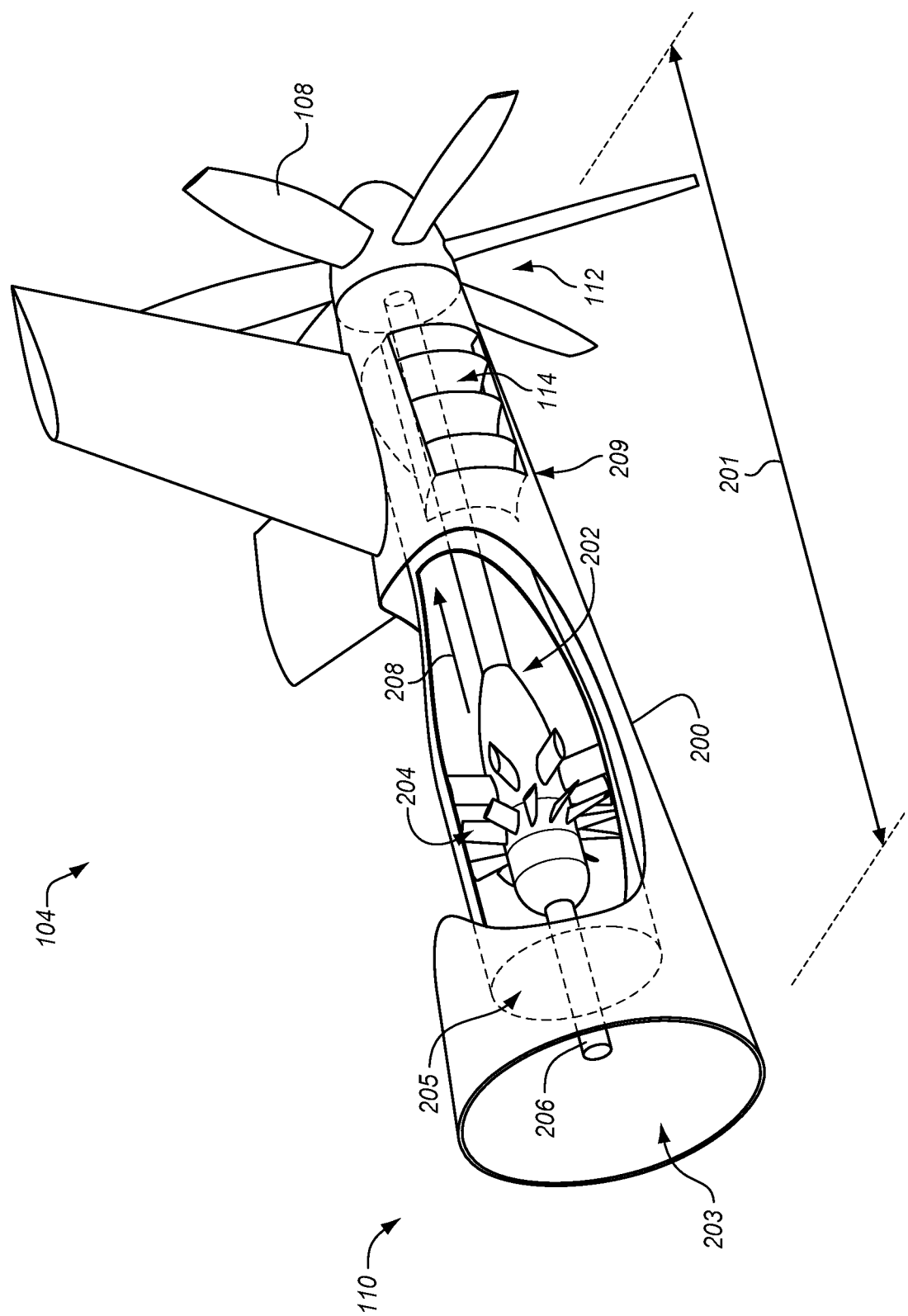
FIG. 2 is a perspective view of a tail boom including some of the internal features of the tail boom in an illustrative embodiment.

FIG. 2 is a perspective view of tail boom 104 including some of the internal features of tail boom 104 in an illustrative embodiment. In this embodiment, tail boom 104 includes an elongated housing 200 having a length 201. A tail boom drive system 202 is disposed within an interior space 203 of elongated housing 200. Interior space 203 is defined by an inside surface 205 of elongated housing 200. Although a particular configuration of interior space 203 is illustrated in FIG. 2, other configurations exist.

In this embodiment, tail boom drive system 202 includes a fan 204 coaxial with, and mechanically coupled to, a shaft 206. Fan 204 is mechanically coupled to shaft 206, and as shaft 206 spins, fan 204 generates a variable airflow 208 which travels within interior space 203 towards second end 112 of tail boom 104. Variable airflow 208 is ejected from opening 114 between interior space 203 and an outside surface 209 of elongated housing 200, which provides a substantially lateral thrust that compensates for the yaw induced on helicopter 100 from main rotor 106. In this embodiment, propulsor 108 is coaxial with, and mechanically coupled to, shaft 206 at second end 112 of tail boom 104. Although propulsor 108 is illustrated as a propeller in this embodiment, propulsor 108 may comprise a ducted fan in other embodiments.

Figure 3:
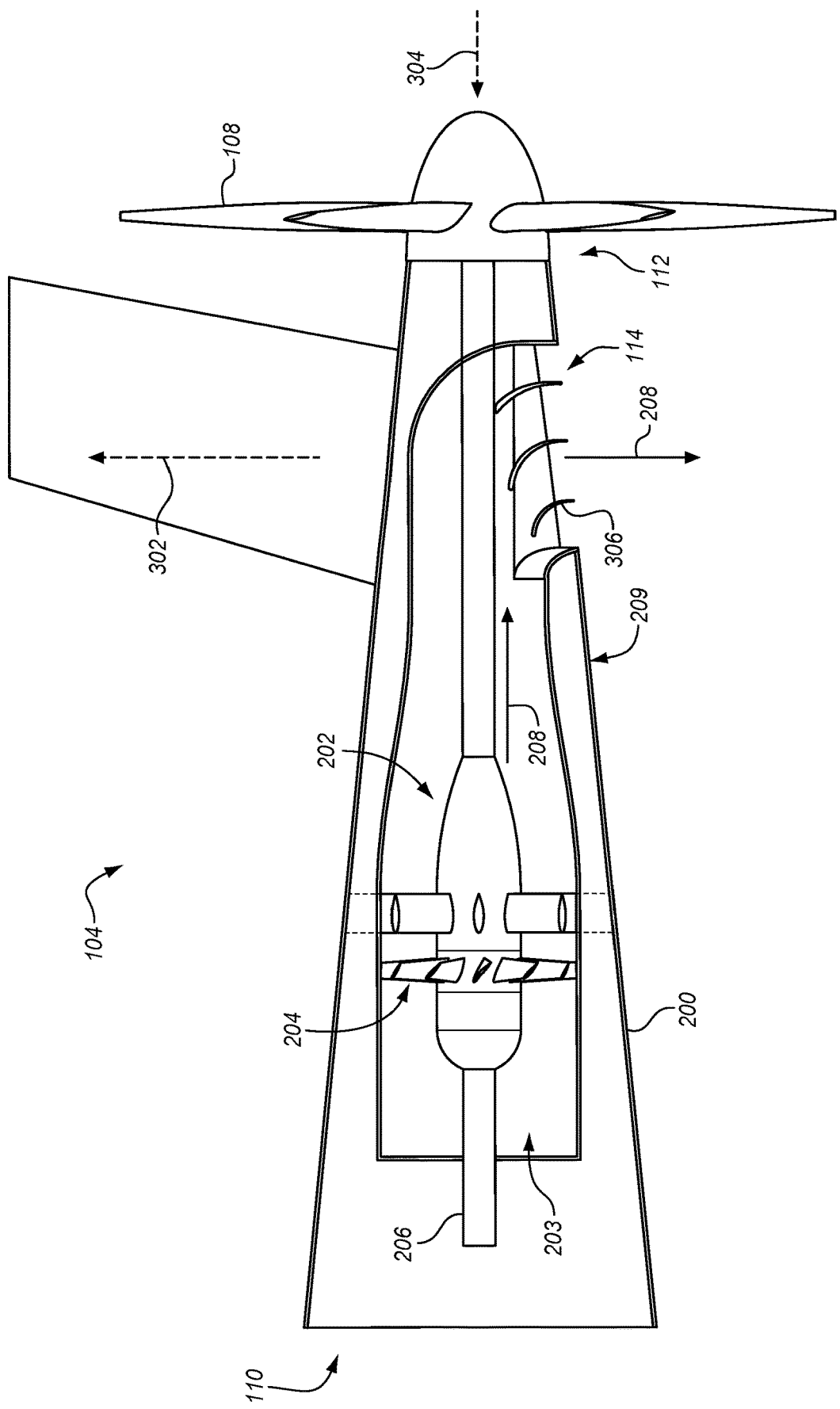
FIG. 3 is a top view of a tail boom including some of the internal features of the tail boom in an illustrative embodiment.

FIG. 3 is a top view of tail boom 104 including some of the internal features of tail boom 104 in an illustrative embodiment. During forward flight, propulsor 108 may generate a variable thrust 304 which is directed generally towards first end 110 of tail boom 104. Variable thrust 304 generated by propulsor 108 aids in increasing the rate of speed at which helicopter 100 travels. Variable thrust 304 may be varied by varying a blade pitch of propulsor 108 and/or by varying a rotational speed of propulsor 108. During a hover operation, propulsor 108 may be de-clutched from shaft 206 in some embodiments to eliminate variable thrust 304. In other embodiments, a blade pitch of propulsor 108 may be set to about zero blade angle to reduce or eliminate variable thrust 304.

As fan 204 rotates and directs variable airflow 208 through interior space 203 of elongated housing 200, variable airflow 208 is ejected from opening 114. A variable lateral thrust 302 is generated by variable airflow 208 which compensates for the yaw induced upon helicopter 100 by main rotor 106. Variable lateral thrust 302 may also be referred to as an anti-torque moment in some embodiments. Variable lateral thrust 302 is substantially perpendicular to tail boom 104, although variable lateral thrust 302 may deviate from perpendicular in some embodiments. Variable airflow 208 may be directed along interior space 203 towards opening 114 using louvers 306, which are configured to redirect variable airflow 208 from an orientation that is substantially parallel to shaft 206 to an orientation that is substantially perpendicular to shaft 206. An orientation of louvers 306 may be varied to vary the direction of variable lateral thrust 302 and/or to change the exit area of the flow in some embodiments. In other embodiments, louvers 306 may be oriented to close off opening 114 in response to variable airflow 208 being reduced below a threshold value.

During a hover operation, variable lateral thrust 302 may be modified by varying a blade pitch of fan 204 and/or by varying a rotational speed of fan 204. During forward flight, fan 204 may be de-clutched from shaft 206 in some embodiments to eliminate variable lateral thrust 302. In other embodiments, a blade pitch of fan 204 may be set to about zero blade angle to eliminate variable lateral thrust 302.

Figure 4:
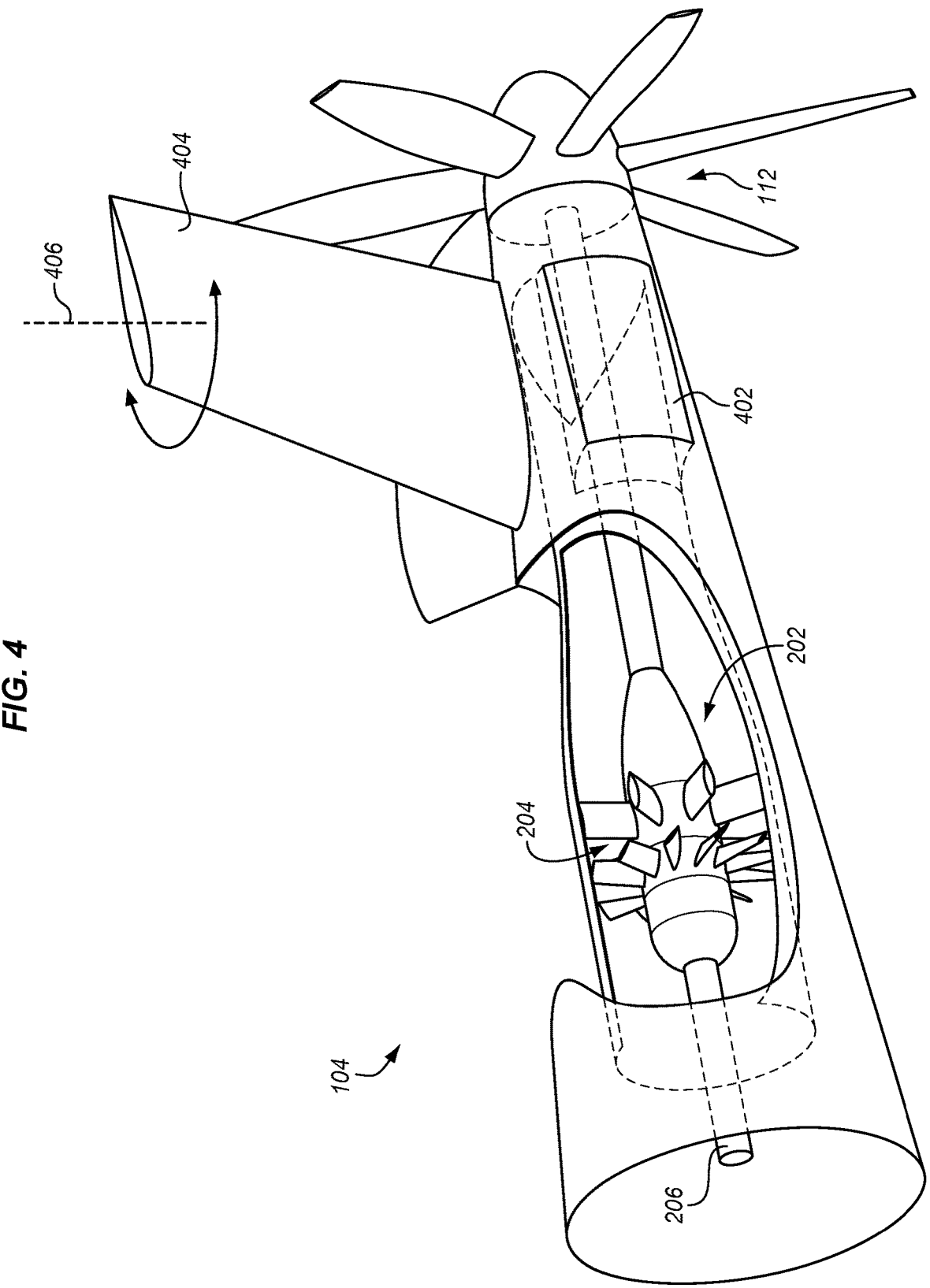
FIG. 4 is another perspective view of a tail boom including some of the internal features of the tail boom in an illustrative embodiment.

FIG. 4 is another perspective view of tail boom 104 including some of the internal features of tail boom 104 in an illustrative embodiment. In this embodiment, a door 402 may be used to cover opening 114 (see FIG. 2) during forward flight to reduce the drag induced upon helicopter 100 by opening 114. When door 402 is positioned over opening 114, fan 204 may be de-clutched from shaft 206 and/or the blade pitch of fan 204 may be set for minimum airflow (e.g., variable airflow 208 is reduced below a threshold value). Door 402 may slide fore and aft and/or rotate to change the exit area of opening 114 based on the amount of variable airflow 208 in some embodiments. During forward flight, a rudder 404 may vary in orientation (e.g., rotate about axis 406) to compensate for the yaw induced upon helicopter 100 by main rotor 106 when door 402 is closed. Rudder 404 extends radially from, and is mounted to, elongated housing 200 proximate to second end 112 of tail boom 104.

Figure 5:
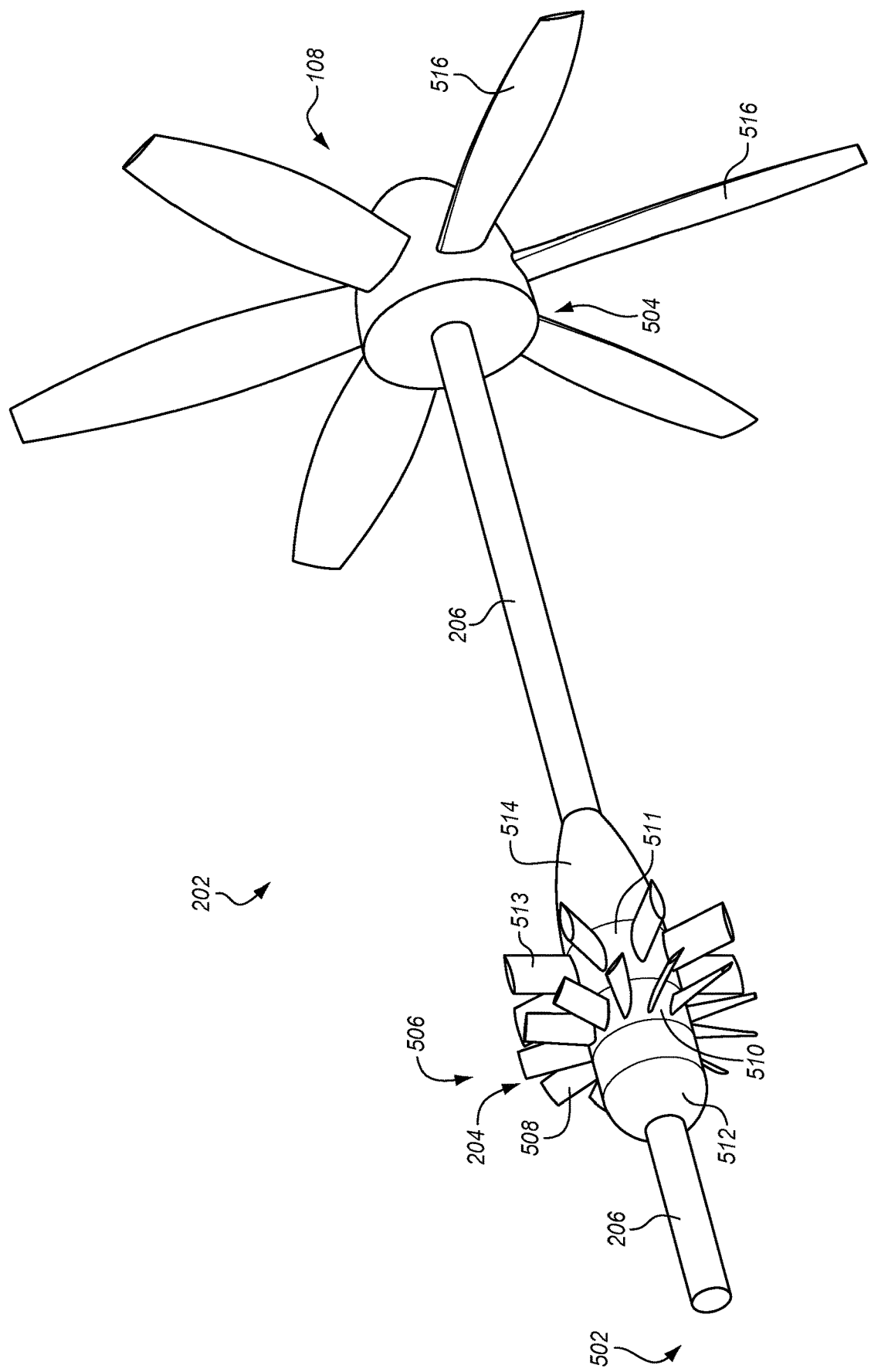
FIG. 5 is a perspective view of a tail boom drive system in an illustrative embodiment.

FIG. 5 illustrates a perspective view of tail boom drive system 202 in an illustrative embodiment. In this embodiment, shaft 206 has a first end 502 and a second end 504 that opposes first end 502. A fan assembly 506 is coaxially mounted to shaft 206 between first end 502 and second end 504. Fan assembly 506 includes fan 204, previously described. Fan 204 includes a plurality of blades 508 radially extending from and mounted to a ring 510, which is mechanically coupled to shaft 206 such that ring 510 rotates as shaft 206 rotates. Ring 510 may be mechanically coupled to shaft 206 via a clutch (not shown) in some embodiments to couple and decouple fan 204 with shaft 206 (see FIG. 2). The pitch of blades 508 may vary in order to modify variable airflow 208. Fan assembly 506 further includes struts 513 radially extending from and mounted to a ring 511. Struts 513 secure fan assembly 506 within tail boom 104, and ring 511 is rotationally coupled to shaft 206. Fan assembly 506 further includes a forward diffuser 512 and a rear diffuser 514, both of which control airflow across fan assembly 506. Further illustrated in FIG. 5 is propulsor 108, which is coaxial with shaft 206 and mechanically coupled to shaft 206 at second end 504 of shaft 206. Propulsor 108 includes a plurality of blades 516, which rotate as shaft 206 rotates. Propulsor 108 may be mechanically coupled to shaft 206 via a clutch (not shown) in some embodiments to couple and decouple propulsor 108 from shaft 206 (see FIG. 3). The pitch of blades 516 may vary in order to modify variable thrust 304.

Figure 6A:
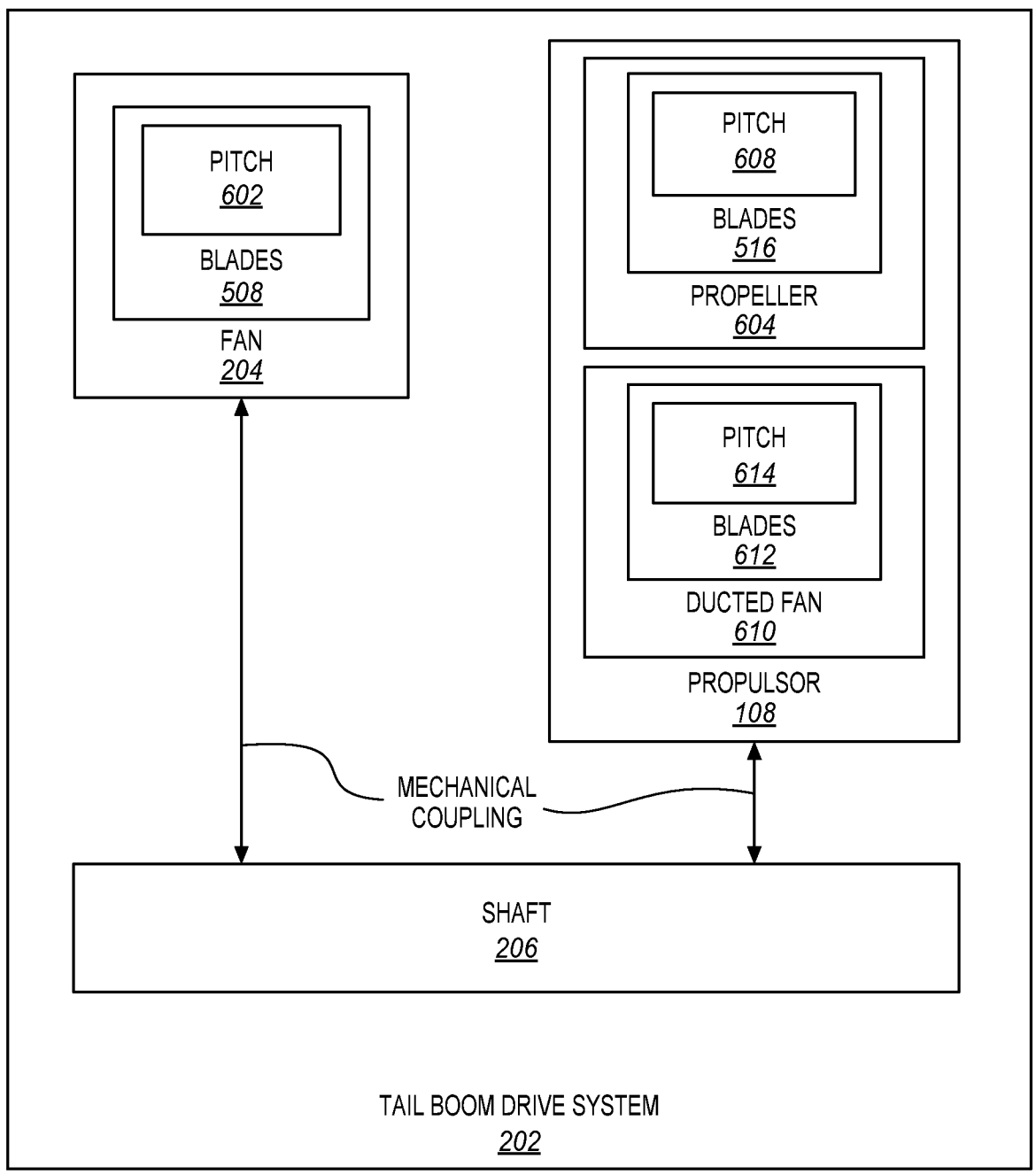
FIGS. 6A-6C are block diagrams of a tail boom drive system in various illustrative embodiments.
Figure 6B:
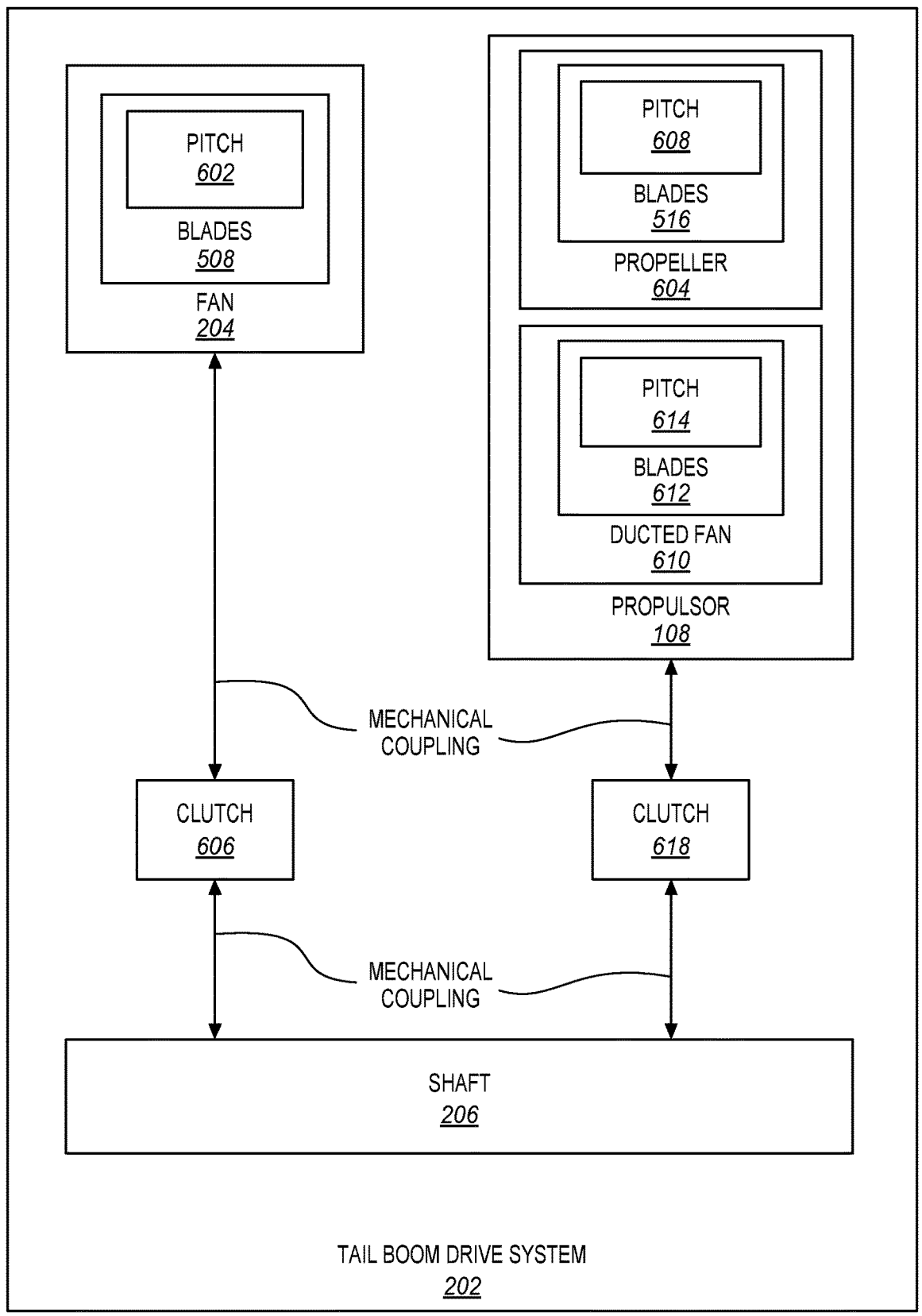
Figure 6C:
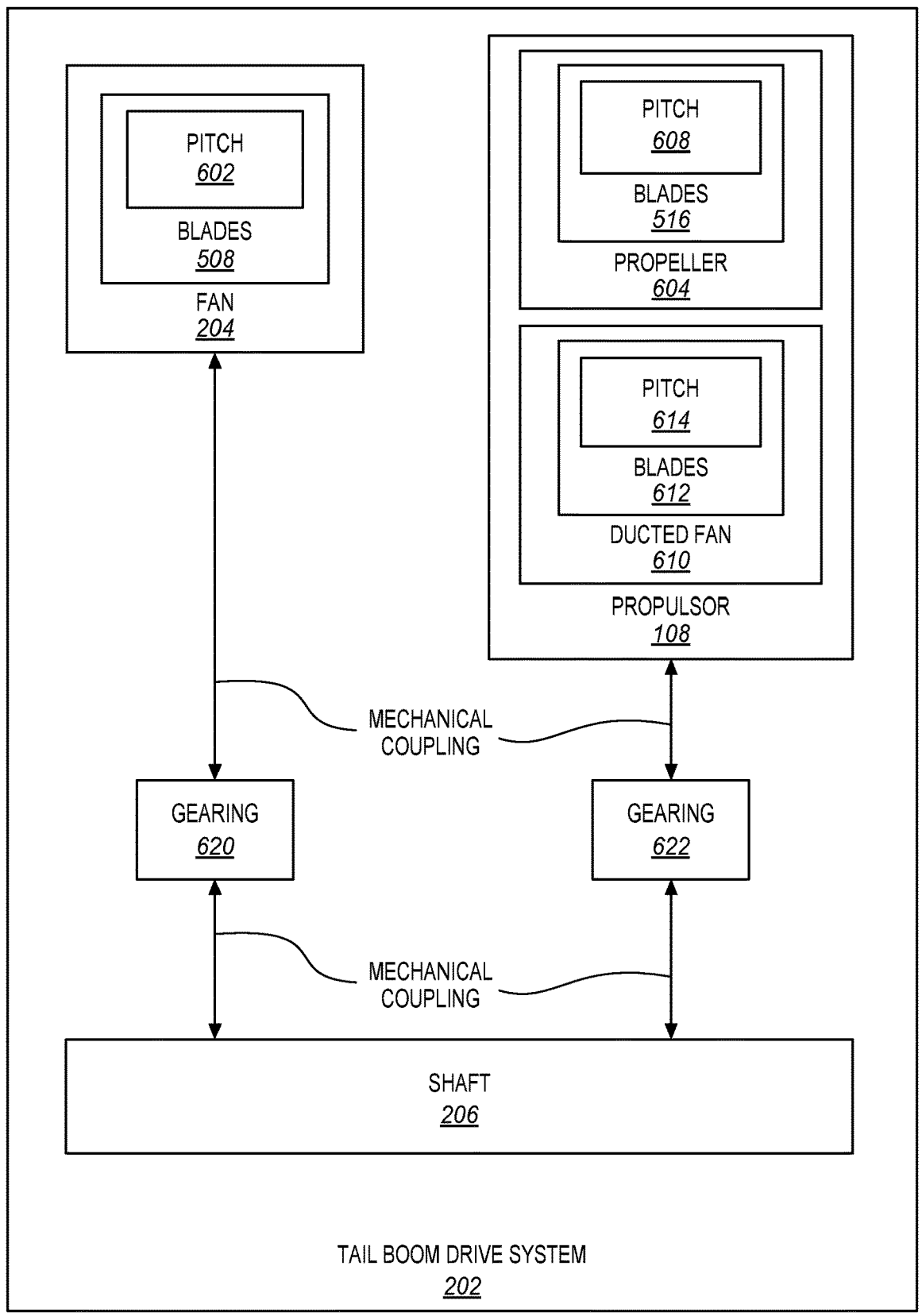
Figure 8:
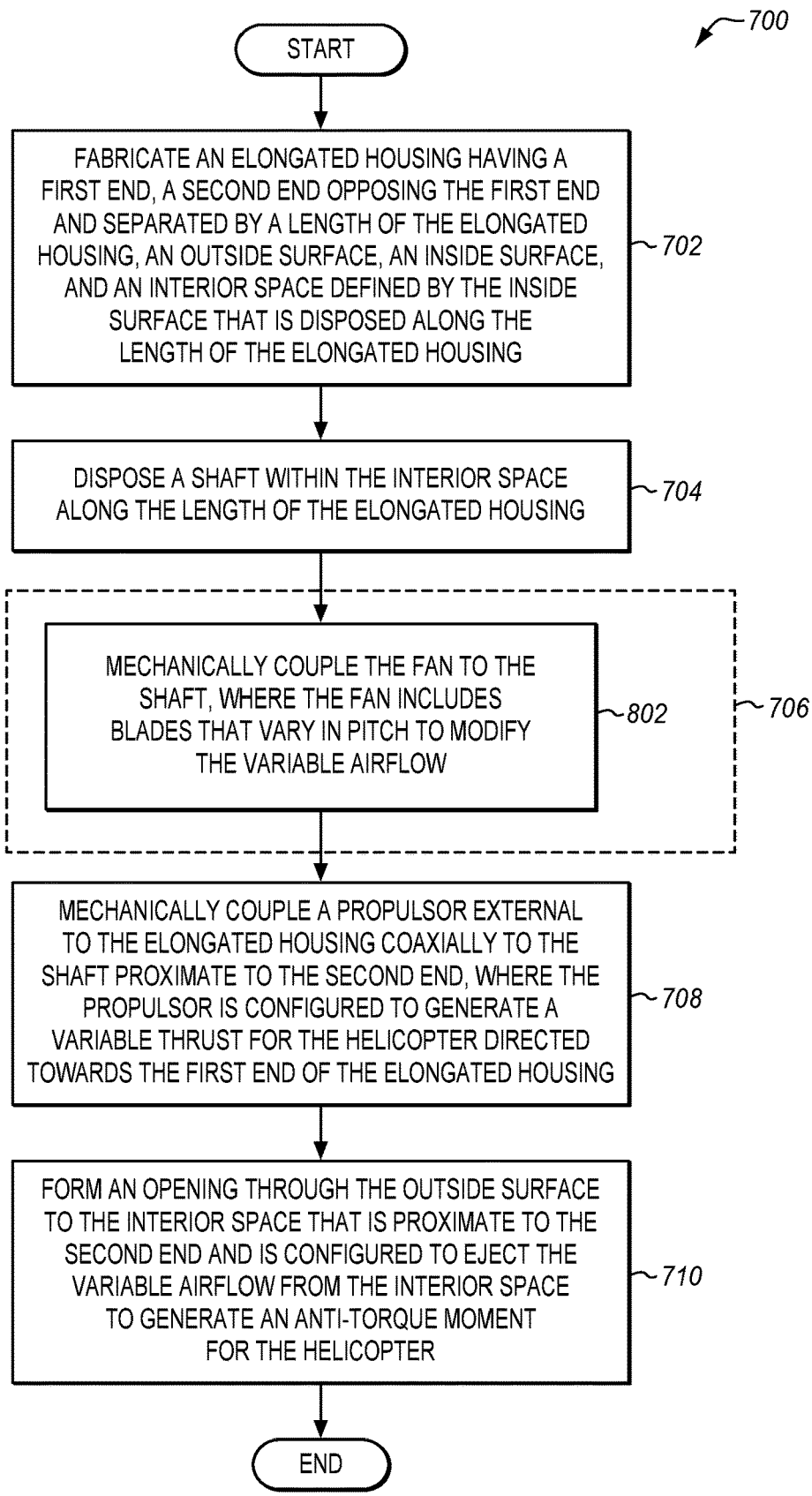
FIGS. 8-15 illustrate additional details of the method of FIG. 7 in various illustrative embodiments.
Figure 9:
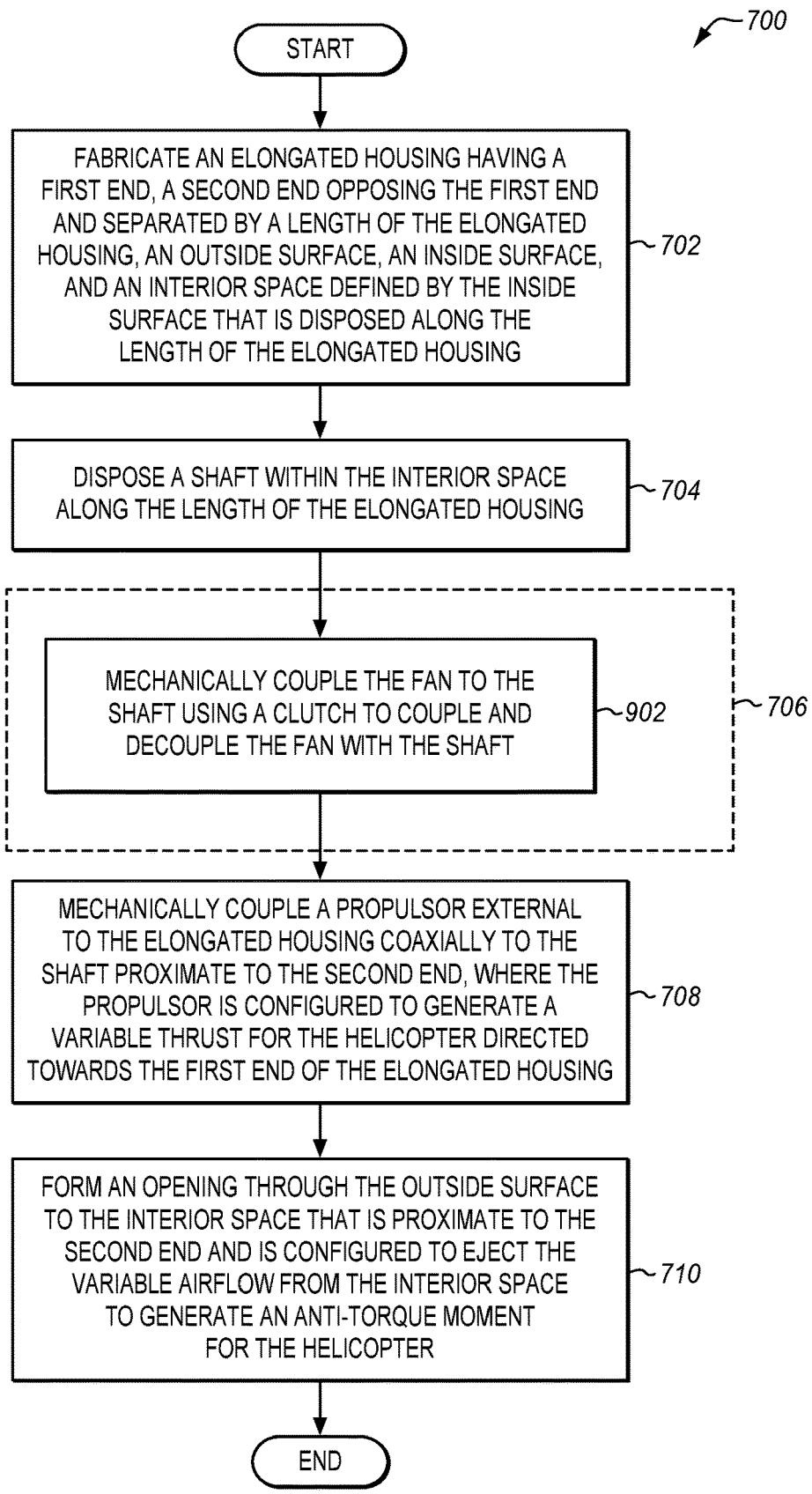
Figure 10:
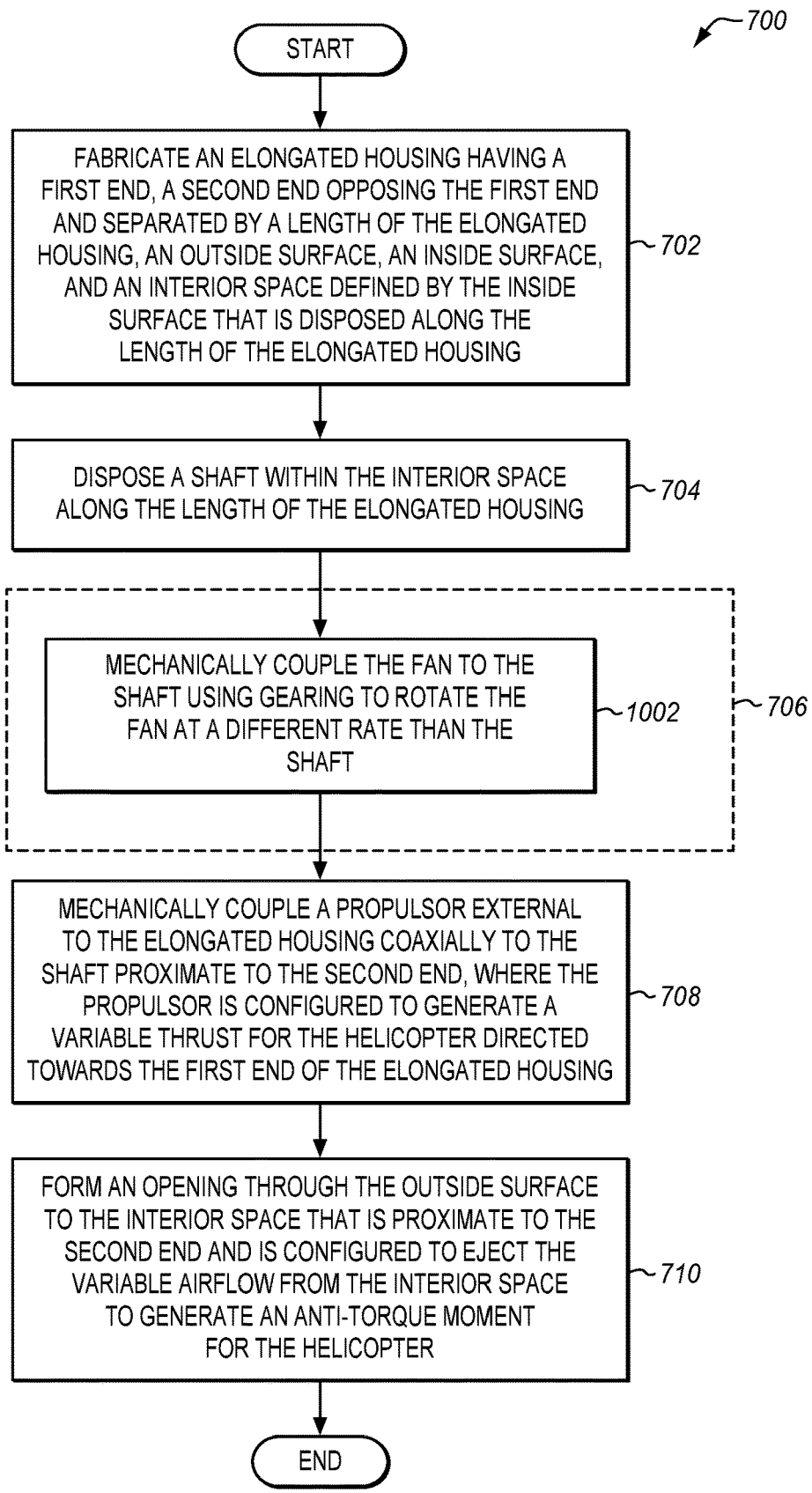

FIGS. 6A-6C are block diagrams of tail boom drive system 202 in various illustrative embodiments. In the embodiment of FIG. 6A, fan 204 is mechanically coupled to shaft 206, and includes any component, system, or device that is configured to generate variable airflow 208 (see FIG. 2). Fan 204 includes blades 508 as previously described. In some embodiments, blades 508 may include a pitch 602 that varies in order to modify variable airflow 208. Propulsor 108 is mechanically coupled to shaft 206, and includes any component, system, or device that is configured to generate variable thrust 304. Propulsor 108 may comprise a propeller 604 in some embodiments. Propeller 604 includes blades 516, which may include a pitch 608 that varies in order to modify variable thrust 304. In other embodiments, propulsor 108 may comprise a ducted fan 610. Ducted fan 610 includes blades 612, which may include a pitch 614 that varies in order to modify variable thrust 304.

In the embodiment of FIG. 6B, fan 204 is mechanically coupled to shaft 206 utilizing a clutch 606. Clutch 606 comprises any component, system, or device that mechanically couples and uncouples fan 204 from shaft 206. For example, clutch 606 may mechanically uncouple fan 204 from shaft 206 in order to terminate variable airflow 208 when blades 508 stop rotating during forward flight of helicopter 100. Clutch 606 mechanically couples fan 204 to shaft 206 in order to generate variable airflow 208 as blades 508 rotate during a hover operation for helicopter 100. In this embodiment, propulsor 108 is mechanically coupled to shaft 206 utilizing a clutch 618. Clutch 618 comprises any component, system, or device that mechanically couples and uncouples propulsor 108 from shaft 206. For example, clutch 618 may mechanically uncouple propulsor 108 from shaft 206 in order to terminate variable thrust 304 when blades 516 or blades 612 stop rotating during a hover operation for helicopter 100. Clutch 618 mechanically couples propulsor 108 to shaft 206 in order to generate variable thrust 304 as blades 516 or blades 612 rotate during forward flight of helicopter 100.

In the embodiment of FIG. 6C, fan 204 is mechanically coupled to shaft 206 utilizing gearing 620. Gearing 620 comprises any component, system, or device that allows fan 204 to rotate at a different rate than shaft 206. For instance, gearing 620 may be utilized to rotate fan 204 faster than shaft 206 in some embodiments. In other embodiments, gearing 620 may be utilized to rotate fan 204 slower than shaft 206. Further in this embodiment, propulsor 108 is mechanically coupled to shaft 206 utilizing gearing 622. Gearing 622 comprises any component, system, or device that allows propulsor 108 to rotate at a different rate than shaft 206. For instance, gearing 622 may be utilized to rotate propulsor 108 faster than shaft 206 in some embodiments. In other embodiments, gearing 622 may be utilized to rotate propulsor 108 slower than shaft 206. For instance, propulsor 108 may be mechanically coupled to shaft 206 utilizing gearing 622 that rotates propulsor 108 slower than shaft 206, which allows the outer tips of blades 516 of propulsor 108 and the outer tips of blades 508 of fan 204 to each operate at their selected speed.

FIG. 7 is a flow chart of a method 700 of fabricating a tail boom for a helicopter in an illustrative embodiment. Method 700 will be discussed with respect to tail boom 104 of helicopter 100, although method 700 may apply to other systems, not shown. Further, method 700 may include other steps, not shown. The steps of method 700 may be performed in an alternate order.

Step 702 comprises fabricating elongated housing 200 (see FIG. 2). Elongated housing 200 may be fabricated utilizing a variety of different materials, including composites, aluminum, or other high-strength materials that are also light in weight. Step 704 comprises disposing shaft 206 within interior space 203 of elongated housing 200 (e.g., along length 201 (see FIG. 2). Step 706 comprises mechanically coupling fan 204 coaxially to shaft 206 within interior space 203. Fan 204 may also be mechanically coupled to inside surface 205 using struts 513 (see FIG. 3). Step 708 comprises mechanically coupling propulsor 108 to shaft 206 proximate to second end 112 of tail boom 104 (and elongated housing 200). Step 710 comprises forming opening 114 through outside surface 209 to interior space 203 that is proximate to second end 112 of tail boom 104 (and elongated housing 200).

FIGS. 8-15 illustrate additional details of method 700 in illustrative embodiments. In one embodiment, blades 508 of fan 204 have a pitch 602 that varies, which modifies variable airflow 208 depending upon pitch 602 (see FIG. 8, step 802). In another embodiment, fan 204 is mechanically coupled to shaft 206 utilizing clutch 606, which allows fan 204 to be mechanically coupled to and mechanically uncoupled from, shaft 206 (see FIG. 9, step 902). In another embodiment, fan 204 is mechanically coupled to shaft 206 utilizing gearing 620 (see FIG. 6C) to rotate fan 204 at a different rate than shaft 206 (see FIG. 10, step 1002).

Figure 11:
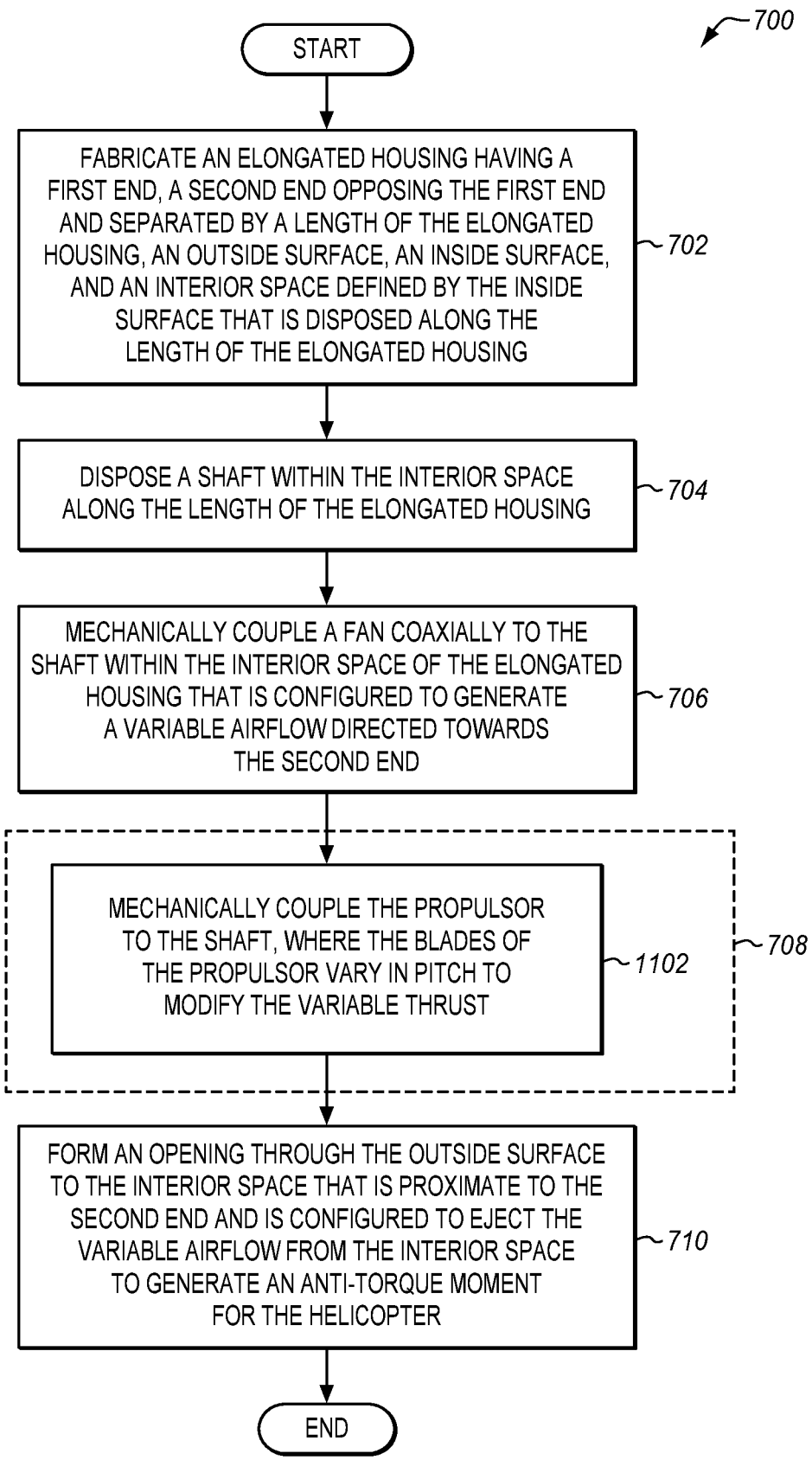
Figure 12:
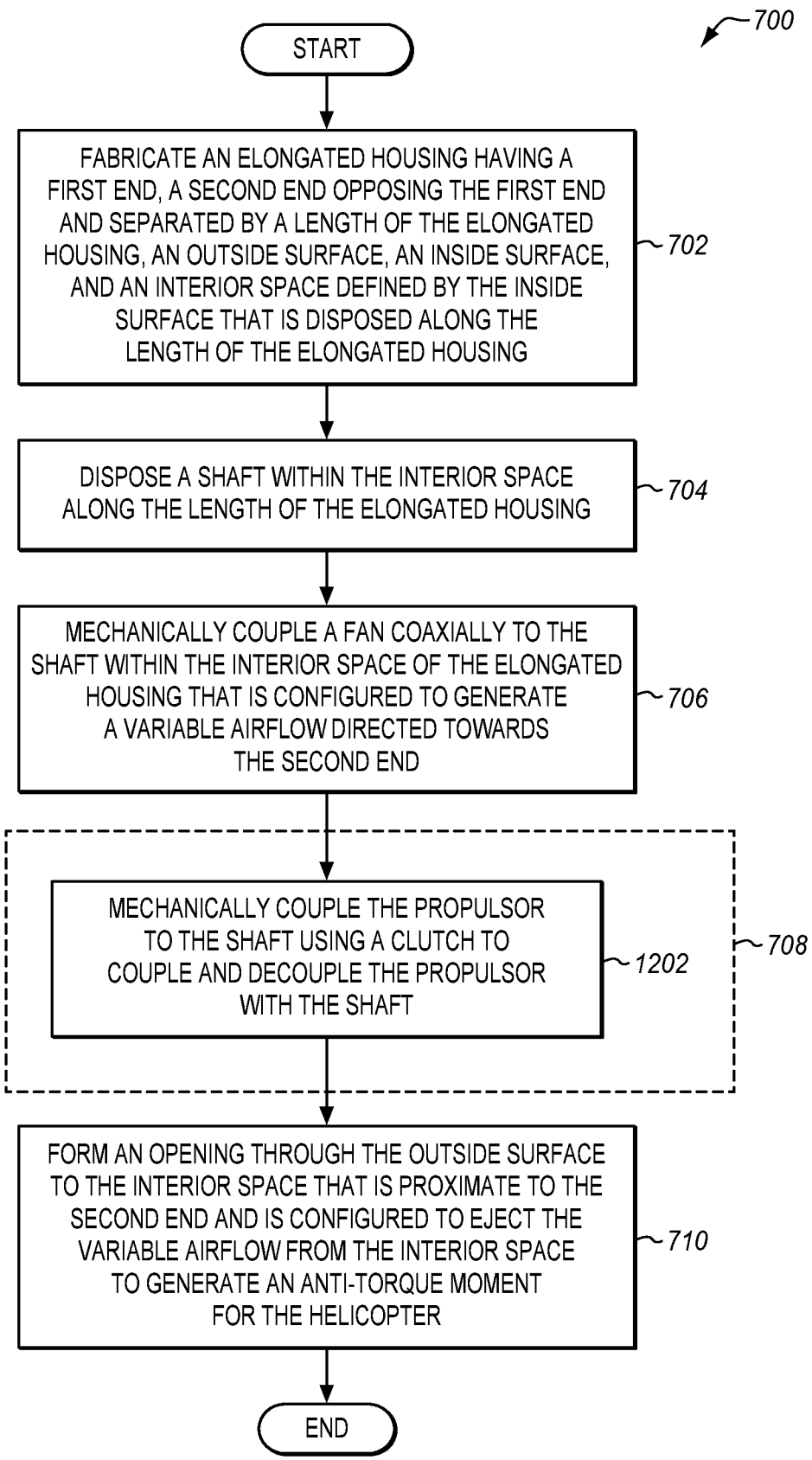
Figure 13:
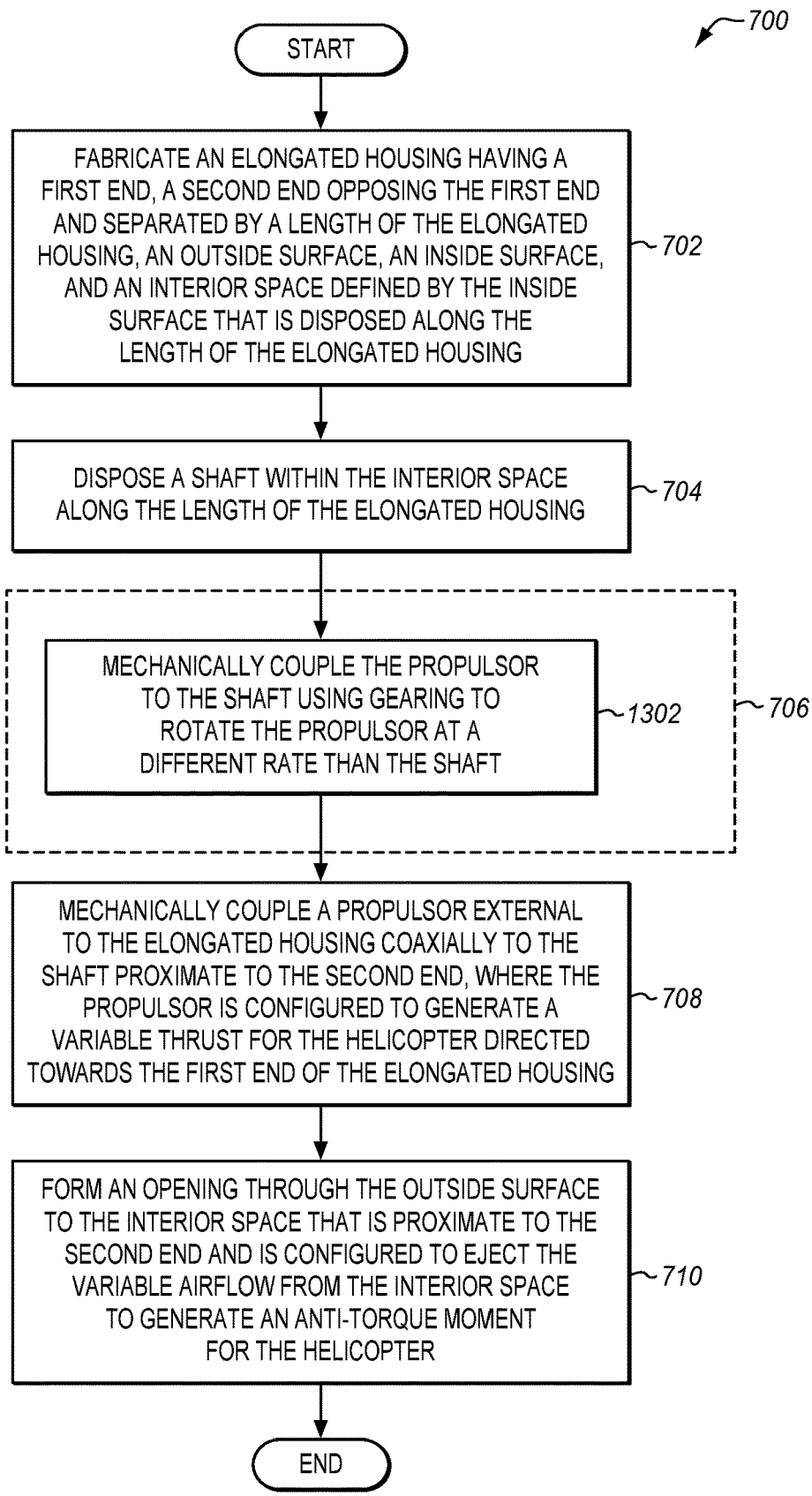

In one embodiment, blades 516 of propulsor 108 have a pitch 608 that varies, which modifies variable airflow 208 depending upon pitch 608 (see FIG. 11, step 1102). In another embodiment, propulsor 108 is mechanically coupled to shaft 206 utilizing clutch 618, which allows propulsor 108 to be mechanically coupled to and mechanically uncoupled from, shaft 206 (see FIG. 12, step 1202). In another embodiment, propulsor 108 is mechanically coupled to shaft 206 utilizing gearing 622 (see FIG. 6C) to rotate propulsor 108 at a different rate than shaft 206 (see FIG. 13, step 1302).

Figure 14:
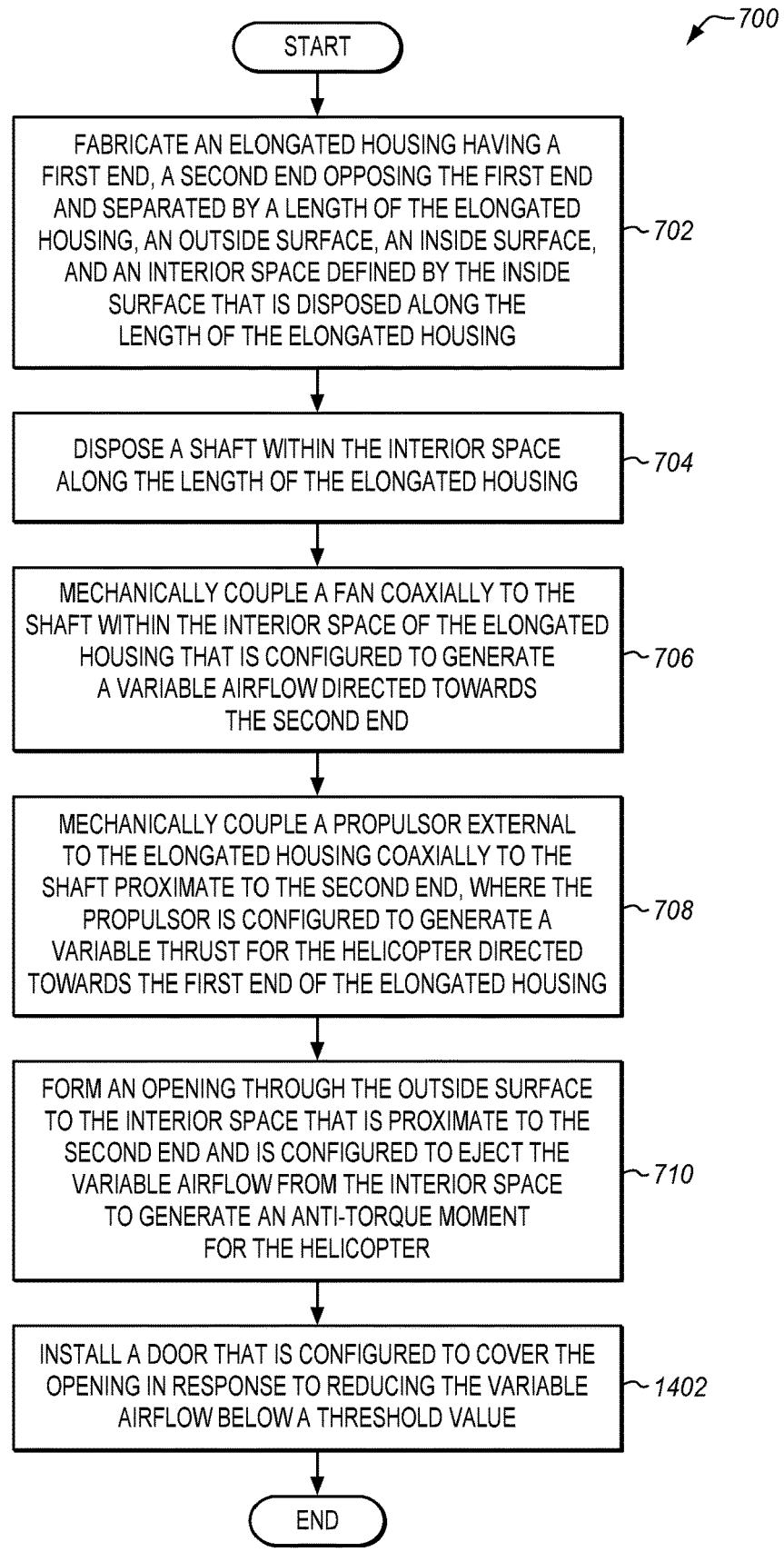
Figure 15:
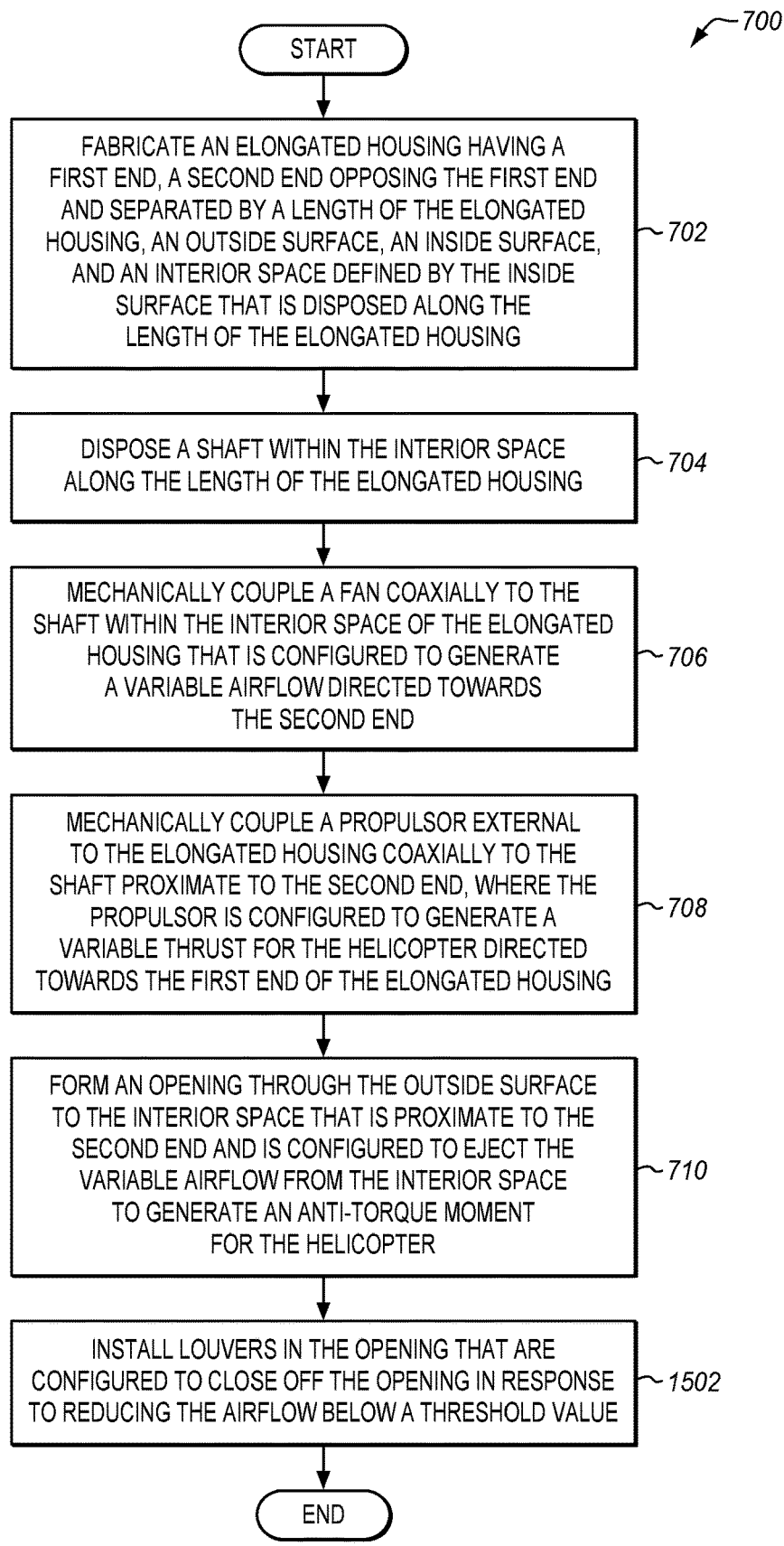

In some embodiments, method 700 further comprises installing door 402 to cover opening 114 in response to reducing variable airflow 208 below a threshold value (see FIG. 14, step 1402). In another embodiment, method 700 further comprises installing louvers 306 that are configured to close off opening 114 in response to reducing variable airflow 208 below a threshold value (see FIG. 15, step 1502).

The tail boom drive system 202 described herein provides both yaw compensation for helicopters utilizing an internal fan 204 that directs variable airflow 208 through an interior of tail boom 104, along with an external propulsor 108 that enhances the forward flight capabilities of helicopter 100. The tail boom drive system 202 therefore improves the performance characteristics for helicopters by eliminating drag induced by the typical tail rotor while further including an external propulsor 108 that aids in forward flight.

Although specific embodiments were described herein, the scope is not limited to those specific embodiments. Rather, the scope is defined by the following claims and any equivalents thereof

What is claimed is:

1. A tail boom, comprising:
an elongated housing;
a shaft disposed lengthwise within an interior space of the housing, wherein the shaft has a first end and a second end opposing the first end;
a fan mechanically coupled coaxially to the shaft within the interior space between the first end and the second end, wherein the fan is configured to generate a variable airflow directed along the interior space substantially parallel to the shaft towards the second end;
louvers configured to redirect the variable airflow generated by the fan from an orientation substantially parallel to the shaft to an orientation substantially perpendicular to the shaft, and eject the variable airflow through an opening in the housing; and
a propulsor external to the housing and mechanically coupled coaxially to the shaft at the second end, wherein the propulsor is configured to generate a variable thrust;
wherein the opening is positioned forward of the propulsor.

2. The tail boom of claim 1, wherein:
the fan includes blades that vary in pitch to modify the variable airflow.

3. The tail boom of claim 1, wherein:
the fan is mechanically coupled to the shaft using a clutch to couple and decouple the fan with the shaft.

4. The tail boom of claim 1, wherein:
the fan is mechanically coupled to the shaft using gearing to rotate the fan at a different rate than the shaft.

5. The tail boom of claim 1, wherein:
the propulsor includes blades that vary in pitch to modify the variable thrust.

6. The tail boom of claim 1, wherein:
the propulsor is mechanically coupled to the shaft using a clutch to couple and decouple the propulsor with the shaft.

7. The tail boom of claim 1, wherein:
the propulsor is mechanically coupled to the shaft using gearing to rotate the propulsor at a different rate than the shaft.

8. The tail boom of claim 1, further comprising a fan assembly that includes:
the fan comprising a plurality of blades radially extending from a first ring mechanically coupled to the shaft; and
struts radially extending from a second ring rotationally coupled to the shaft, and secured to the housing.

9. The tail boom of claim 8, wherein the fan assembly further includes:
a forward diffuser disposed between the first end of the shaft and the fan; and
a rear diffuser disposed between the struts and the second end of the shaft.

10. A tail boom of a helicopter, the tail boom comprising:
an elongated housing having a first end coupled to a fuselage of the helicopter, a second end opposing the first end and separated by a length of the elongated housing, an outside surface, an inside surface, and an interior space defined by the inside surface that is disposed along the length;
an opening through the outside surface to the interior space that is proximate to the second end;
a shaft disposed within the interior space along the length;
a fan mechanically coupled coaxially to the shaft within the interior space that is configured to generate a variable airflow directed towards the second end;
louvers configured to redirect the variable airflow generated by the fan from an orientation substantially parallel to the shaft to an orientation substantially perpendicular to the shaft, and eject the variable airflow through the opening to generate a variable anti-torque moment for the helicopter; and
a propulsor external to the elongated housing and mechanically coupled coaxially to the shaft proximate to the second end, wherein the propulsor is configured to generate a variable thrust for the helicopter;
wherein the propulsor is positioned rearward of the opening.

11. The tail boom of claim 10, wherein:
the fan includes blades that vary in pitch to modify the variable airflow.

12. The tail boom of claim 10, wherein:
the fan is mechanically coupled to the shaft using a clutch to couple and decouple the fan with the shaft.

13. The tail boom of claim 10, wherein:
the fan is mechanically coupled to the shaft using gearing to rotate the fan at a different rate than the shaft.

14. The tail boom of claim 10, wherein:
the propulsor includes blades that vary in pitch to modify the variable thrust.

15. The tail boom of claim 10, wherein:
the propulsor is mechanically coupled to the shaft using gearing to rotate the propulsor at a different rate than the shaft.

16. The tail boom of claim 10, wherein:
the propulsor comprises a propeller.

17. The tail boom of claim 10, wherein:
the propulsor comprises a ducted fan.

18. The tail boom of claim 10, further comprising:
a door configured to cover the opening when the variable airflow is below a threshold value.

19. The tail boom of claim 18, further comprising:
a rudder configured to compensate for yaw when the door covers the opening.

20. A method of fabricating a tail boom of a helicopter, the method comprising:
fabricating an elongated housing having a first end coupled to a fuselage of the helicopter, a second end opposing the first end and separated by a length of the elongated housing, an outside surface, an inside surface, and an interior space defined by the inside surface that is disposed along the length;
forming an opening through the outside surface to the interior space that is proximate to the second end;
disposing a shaft within the interior space along the length;
mechanically coupling a fan coaxially to the shaft within the interior space that is configured to generate a variable airflow directed towards the second end;
disposing louvers that redirect the variable airflow generated by the fan from an orientation substantially parallel to the shaft to an orientation substantially perpendicular to the shaft, and eject the variable airflow through the opening to generate a variable anti-torque moment for the helicopter; and
mechanically coupling a propulsor external to the elongated housing coaxially to the shaft proximate to the second end and rearward of the opening, wherein the propulsor is configured to generate a variable thrust for the helicopter.

21. The method of claim 20, wherein:
the fan includes blades that vary in pitch to modify the variable airflow.

22. The method of claim 20, wherein mechanically coupling the fan further comprises:
mechanically coupling the fan to the shaft using a clutch to couple and decouple the fan with the shaft.

23. The method of claim 20, wherein mechanically coupling the fan further comprises:
mechanically coupling the fan to the shaft using gearing to rotate the fan at a different rate than the shaft.

24. The method of claim 20, wherein:
the propulsor includes blades that vary in pitch to modify the variable thrust.

25. The method of claim 20, wherein mechanically coupling the propulsor further comprises:
mechanically coupling the propulsor to the shaft using gearing to rotate the propulsor at a different rate than the shaft.

26. The method of claim 20, wherein:
the propulsor comprises a propeller.

27. The method of claim 20, wherein:
the propulsor comprises a ducted fan.

28. The method of claim 20, further comprising:
installing a door configured to cover the opening when the variable airflow is below a threshold value.

29. The method of claim 28, further comprising:
installing a rudder proximate to the second end configured to compensate for yaw when the door covers the opening.

\* \* \* \* \*